United States Patent [19]

Izumitani et al.

[11] Patent Number: 4,625,009

[45] Date of Patent: Nov. 25, 1986

[54] HIGH-HYDRATION CONTACT LENS

[75] Inventors: Tetsuro Izumitani; Niro Tarumi; Shigeo Komiya; Takeyuki Sawamoto, all of Tokyo, Japan

[73] Assignee: Hoya Corporation, Tokyo, Japan

[21] Appl. No.: 845,936

[22] Filed: Mar. 31, 1986

[30] Foreign Application Priority Data

Mar. 30, 1985 [JP] Japan .................................. 60-65015

[51] Int. Cl.$^4$ ............................................. C08F 20/54
[52] U.S. Cl. .................................. 526/307.5; 526/307.6
[58] Field of Search .................. 526/307.5, 307.6, 307.7

[56] References Cited

U.S. PATENT DOCUMENTS

| 4,267,295 | 5/1981 | Gallop | 526/307.5 |
| 4,275,183 | 6/1981 | Kuzma | 526/307.5 |
| 4,463,148 | 7/1984 | Hofer | 526/307.5 |

Primary Examiner—Paul R. Michl
Attorney, Agent, or Firm—Cushman, Darby & Cushman

[57] ABSTRACT

A high-hydration contact lens having a high strength is disclosed which is made of a copolymer composed of (i) 40 to 90 wt. % of N,N-dimethyl acrylamide, (ii) 5 to 50 wt. % of a hydrophobic monomer, (iii) 0.1 to 10 wt. % of an unsaturated carboxylic acid having one ethylenically unsaturated bond, and (iv) 0.01 to 5.0 wt. % of a crosslinking agent, wherein the hydrophobic monomer is selected from the group consisting of phenyl acrylates, benzyl acrylates, phenyl methacrylates, benzyl methacrylates, alkyl acrylates, alkyl methacrylates, cyclohexyl acrylates and cyclohexyl methacrylates, and the crosslinking agent is selected from those represented by formula (I), (II), or (III)

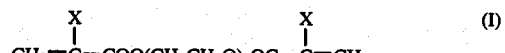

(I)

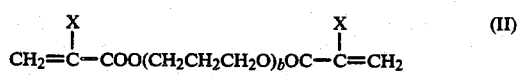

(II)

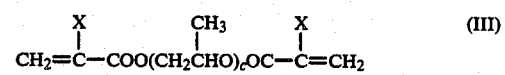

(III)

wherein X represents a hydrogen atom or a methyl group, a is an integer of 2 to 23, and b and c each is an integer of 2 to 14.

5 Claims, No Drawings

HIGH-HYDRATION CONTACT LENS

FIELD OF THE INVENTION

The present invention relates to a high-hydration contact lens, and more particularly, to a transparent colorless contact lens which has a high water content and yet exhibits high mechanical strength.

BACKGROUND OF THE INVENTION

Soft contact lenses have so far been prepared typically from homo- or copolymers of acrylic derivatives having OH groups. These materials swell upon absorbing water, have a high degree of transparency and are possessed of good machining qualities, hence being suitable for use in the making of soft contact lenses having a high degree of comfort and adaptability to the eye.

With a view to permitting extended and continuous wear, high-hydration soft contact lenses having an increased water content has recently been proposed. These high-hydration soft contact lenses are made principally from N-vinylpyrrolidone and have high water content. Because of these features, the lens has a sufficient permeability to supply the oxygen necessary for a physiological environment for the cornea, thereby maintaining the active aerobic metabolism of the cornea and contributing significantly to the attainment of physiological safety for the eye.

However, if the water content of the materials principally made from N-vinylpyrrolidone is increased, they experience an abrupt drop in strength and the lens prepared from such materials is subject to durability-associated problems including complete lens failure and development of surface flaws. In addition, the high-water-content materials have such a low water retention that the lens prepared therefrom dries up easily to deform or experience other dimensional instabilities.

High-hydration soft contact lenses of poly(N,N-dimethyl acrylamide) are also known. However, the polymer has a low water retention, so if exposed to a dry atmosphere, the water content of the lens is reduced as a result of evaporation and the lens is distorted and lose the initially designed shape.

SUMMARY OF THE INVENTION

One object, therefore, of the present invention is to provide a contact lens that has a high water content of 60% or more and which yet exhibits a high tensile strength.

Another object of the present invention is to provide a high-hydration contact lens that has an oxygen permeability high enough to permit extended and continuous wear.

Still another object of the present invention is to provide a colorless and transparent high-hydration contact lens.

In order to eliminate the aforementioned defects of the conventional high-hydration soft contact lens, the present inventors made concerted efforts and have found that the desired lens material which is capable of satisfying the high water content and high strength requirements simultaneously can be prepared by copolymerizing predetermined proportions of N,N-dimethyl acrylamide, a hydrophobic monomer, an unsaturated carboxylic acid and a specified crosslinking agent. The present invention has been accomplished on the basis of this finding.

That is, the present invention is a high-hydration contact lens with a water content of 60% or more which is made of a copolymer composed of (i) 40 to 90 wt% of N,N-dimethyl acrylamide, (ii) 5 to 50 wt% of a hydrophobic monomer, (iii) 0.1 to 10 wt% of an unsaturated carboxylic acid having one ethylenically unsaturated bond, and (iv) 0.01 to 5.0 wt% of a crosslinking agent, wherein the hydrophobic monomer is selected from the group consisting of phenyl acrylates, benzyl acrylates, phenyl methacrylates, benzyl methacrylates, alkyl acrylates, alkyl methacrylates, cyclohexyl acrylates and cyclohexyl methacrylates, and the crosslinking agent is selected from those represented by formula (I), (II) or (III)

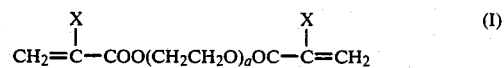

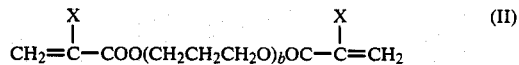

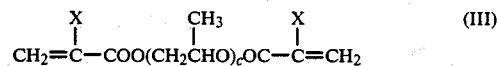

wherein X represents a hydrogen atom or a methyl group, a is an integer of 2 to 23, and b and c each is an integer of 2 to 14.

DETAILED DESCRIPTION OF THE INVENTION

The hydrophobic monomers (ii) which can be used in the present invention include phenyl acrylates, benzyl acrylates, phenyl methacrylates, benzyl methacrylates, alkyl acrylates preferably having the alkyl moiety of 4 to 30 carbon atoms, alkyl methacrylates preferably having the alkyl moiety of 4 to 30 carbon atoms, cyclohexyl acrylates, and cyclohexyl methacrylates, which may be substituted with an alkyl group, an alkoxy group, an aryl group, an aralkyl group, an aryloxy group, etc. Examples of these hydrophobic monomers are listed below.

Phenyl acrylates phenyl acrylate, o-methylphenyl acrylate, m-methylphenyl acrylate, p-methylphenyl acrylate, o-methoxyphenyl acrylate, m-methoxyphenyl acrylate, p-methoxyphenyl acrylate, o-ethoxyphenyl acrylate, m-ethoxyphenyl acrylate, p-ethoxyphenyl acrylate, biphenyl acrylate, o-benzylphenyl acrylate, m-benzylphenyl acrylate and p-benzylphenyl acrylate

Benzyl acrylates benzyl acrylate, o-methylbenzyl acrylate, m-methylbenzyl acrylate, p-methylbenzyl acrylate, o-methoxybenzyl acrylate, m-methoxybenzyl acrylate, p-methoxybenzyl acrylate, o-ethoxybenzyl acrylate, m-ethoxybenzyl acrylate, p-ethoxybenzyl acrylate, o-n-butylbenzyl acrylate, m-n-butylbenzyl acrylate, p-n-butylbenzyl acrylate, o-phenoxybenzyl acrylate, m-phenoxybenzyl acrylate, p-phenoxybenzyl acrylate, m-phenylbenzyl acrylate, o-phenylbenzyl acrylate, and p-phenylbenzyl acrylate

Phenyl methacrylates phenyl methacrylate, o-methylphenyl methacrylate, m-methylphenyl methacrylate, p-methylphenyl methacrylate, o-methoxyphenyl methacrylate, m-methoxyphenyl methacrylate, p-methoxyphenyl methacrylate, o-ethoxyphenyl methacrylate, m-ethoxyphenyl methacrylate, p-ethoxyphenyl methacrylate, biphenyl methacrylate, o-benzylphenyl methacrylate, m-benzylphenyl methacrylate, and p-benzylphenyl methacrylate

Benzy methacrylates benzyl methacrylate, o-methylbenzyl methacrylate, m-methylbenzyl methacrylate, p-methylbenzyl methacrylate, o-methoxybenzyl methacrylate, m-methoxybenzyl methacrylate, p-methoxybenzyl methacrylate, o-ethoxybenzyl methacrylate, m-ethoxybenzyl methacrylate, p-ethoxybenzyl methacrylate, o-n-butylbenzyl methacrylate, m-n-butylbenzyl methyacrylate, p-n-butylbenzyl methacrylate, o-phenoxybenzyl methacrylate, m-phenoxybenzyl methacrylate, p-phenoxybenzyl methacrylate, o-phenylbenzyl methacrylate, m-phenylbenzyl methacrylate, and p-phenylbenzyl methacrylate

Cyclohexyl acrylates cyclohexyl acrylate, 4-methylcyclohexyl acrylate, 3-ethylcyclohexyl acrylate, 4-t-butylcyclohexyl acrylate, 4-n-butylcyclohexyl acrylate, 4-phenylcyclohexyl acrylate, 4-cyclohexylcyclohexyl acrylate, and 4-phenoxyethylcyclohexyl acrylate

Cyclohexyl methacrylates cyclohexyl methacrylate, 4-methylcyclohexyl methacrylate, 3-ethylcyclohexyl methacrylate, 4-t-butylcyclohexyl methacrylate, 4-n-butylcyclohexyl methacrylate, 4-phenylcyclohexyl methacrylate, 4-cyclohexylcyclohexyl methacrylate, and 4-phenoxyethylcyclohexyl methacrylate

Alkyl acrylates n-butyl acrylate, 2-ethylhexyl acrylate, lauryl acrylate, and stearyl acrylate

Alkyl methacrylates n-butyl methacrylate, 2-ethylhexyl methacrylate, lauryl methacrylate, and stearyl methacrylate The hydrophobic monomers (ii) are effective for the purposes of controlling the water content and affording tensile strength and elongation. Cyclohexyl methacrylates are particularly effective in affording tensile strength.

In order to ensure the intended advantage of the present invention, the use of an unsaturated carboxylic acid having one ethylenically unsaturated bond (iii) is essential. Incorporation of this unsaturated carboxylic acid permits a greater amount of water to be contained in the contact lens easily. Preferred examples of the unsaturated carboxylic acid (iii) include acrylic acid, methacrylic acid, itaconic acid, crotonic acid, pyruvic acid, fumaric acid, and maleic acid.

The crosslinking agents (iv) are essential for the purposes of controlling the water content and affording tensile strength, and long-chained crosslinking agents are particularly effective in affording tensile strength. Commonly employed short-chained crosslinking agents such as ethylene glycol dimethacrylate and allyl methacrylates are unable to provide significant improvement in the tensile strength of high-hydration polymers. Extremely long-chained crosslinking agents such as polyethylene glycol dimetharylate having 30 moles of ethylene oxide units also fail to provide improved strength for the high-hydration polymers; at the same time, they degrade the machining qualities (e.g., cutting, grinding and polishing) of the polymers. In formulae (I), (II) and (III) described above, a, b, and c each is preferably an integer of 3 to 9.

The amount of the crosslinking agent to be used varies with its type but should be selected from the range of 0.01 to 5.0 wt%. If it is outside the range, the tensile strength of the resulting polymer becomes too low to ensure its practical use. If the crosslinking agent defined by the present invention is used in the proper amount, the polymer obtained has a markedly increased tensile strength as compared to polymers without crosslinking agent.

The high-hydration contact lens of the present invention may be manufactured by the following procedure: first, a monomer solution is prepared from a mixture of 40 to 90 wt% of N,N-dimethyl acrylamide, 5 to 50 wt% of the hydrophobic monomer, 0.01 to 5.0 wt% of the crosslinking agent, 0.1 to 10 wt% of the unsaturated carboxylic acid having one ethylenically unsaturated bond and 0.01 to 0.5 wt% of a polymerization initiator; the solution then is poured into a predetermined mold; after hermetically sealing the mold, it is heated in a thermostated bath for a predetermined period; the resulting rod is cut into blanks with a predetermined thickness; the blanks are ground and polished to form the lenses of the required optical shape; and the finished lenses are then reswollen by immersion in a physiological saline solution.

The monomer mixture may be directly formed into the final shape of a contact lens by cast polymerization. Alternatively, the polymer may be cast into the desired shape under exposure to ultraviolet radiation.

Polymerization initiators that can be used in the present invention include azobis-based initiators such as azobisisobutyronitrile and azobisvaleronitrile, and peroxide-based initiators such as benzoyl peroxide, lauroyl peroxide and diisopropyl peroxydicarbonate.

The contact lens thus produced in accordance with the present invention has the following superior properties:

(1) Containing the hydrophilic N,N-dimethyl acrylamide as the principal component, the lens has a high water content and can transmit necessary and sufficient oxygen to the physiological environment for the cornea;

(2) The lens has high hydration and yet is possessed of tensile strength and breaking elongation which are far greater than the values exhibited by the conventional high-hydration contact lens;

(3) Commercial soft contact lenses of the type which uses N-vinylpyrrolidone as the primary component have a pale yellow color but the lens of the present invention is colorless and transparent and has a high transmittance of visible light; and (4) The lens of the present invention experiences a minimum degree of variation in shape when it is in the swollen state, and this represents a marked advance over conventional high-hydration contact lens made of poly(N,N-dimethylacrylamide).

The following working examples and comparative examples are provided for the purpose of further illustrating the present invention but are by no means to be taken as limiting. In the examples, all "parts" are by weight.

EXAMPLE 1

A monomer solution consisting of a mixture of N,N-dimethyl acrylamide (68 parts), cryclohexyl methacrylate (30 parts), triethylene glycol dimethacrylate (0.2 part), acrylic acid (2 parts) and azobisisobutyronitrile (0.05 part) was poured into a mold, which was hermetically sealed and heated in a thermostated bath from 50° to 120° C. over a period of 24 hours. After completion of the polymerization, the mold was cooled to room temperature and the resulting copolymer was separated. The copolymer was a colorless and transparent hard material.

This polymer was shaped into a contact lens by conventional methods of machining and polishing.

The finished lens was swollen by immersion in a 0.9% physiological saline solution. The swollen lens was as colorless and transparent as it was in the dry state. It had a water content of 76%, and an oxygen permeability coefficient of $50 \times 10^{-11}$ ml·cm/cm$^2$·sec·mmHg (30° C.). In the hydrated state, the lens had a tensile strength of 343 g/mm$^2$ and a breaking elongation of 600.

EXAMPLES 2 TO 11 AND COMPARATIVE EXAMPLES 1 TO 3

Samples of swollen contact lenses were prepared as in Example 1 except that the composition of the monomer mixture was changed to those indicated in Table 1. The water content, oxygen permeability coefficient, tensile strength and breaking elongation of each sample were measured and the results are shown in Table 1.

TABLE 1

| Example No. | Composition (parts by weight) | Water*[1] content | Oxygen permeability coefficient*[2] | Tensile*[3] strength | Elongation*[4] |
|---|---|---|---|---|---|
| 2 | DMAA/CHMA/B/MAA (70/30/0.1/0.5) | 77 | 51 | 306 | 550 |
| 3 | DMAA/CHMA/C/AA (70/30/0.3/1) | 72 | 41 | 275 | 500 |
| 4 | DMAA/CHMA/D/IA (70/30/0.05/0.5) | 81 | 55 | 210 | 480 |
| 5 | DMAA/BzMA/C/AA (60/40/0.1/10) | 74 | 47 | 195 | 400 |
| 6 | DMAA/BPMA/E/MAA (80/20/0.5/0.1) | 83 | 58 | 164 | 430 |
| 7 | DMAA/EHMA/A/AA (66/30/0.2/4) | 81 | 54 | 223 | 410 |
| 8 | DMAA/LAMA/B/MAA (90/10/0.2/0.2) | 76 | 49 | 215 | 570 |
| 9 | DMAA/PHMA/E/AA (60/35/0.5/5) | 68 | 38 | 240 | 380 |
| 10 | DMAA/CHA/B/AA (64/34/0.3/3) | 75 | 50 | 385 | 580 |
| 11 | DMAA/EHA/A/AA (66/30/0.4/2) | 80 | 53 | 212 | 670 |
| Comp. Ex. 1 | NVP/MAA/F (80/20/1) | 65 | 27 | 55 | 150 |
| Comp. Ex. 2 | NVP/BzMA/G (85/15/0.7) | 73 | 35 | 66 | 140 |
| Comp. Ex. 3 | NVP/BzMA/H (85/15/0.7) | 73 | 36 | 75 | 160 |

Abbreviations for Monomers:
DMAA: N,N—dimethyl acrylamide
NVP: N—vinylpyrrolidone
PHMA: phenyl methacrylate
MMA: methyl methacrylate
BPMA: p-benzylphenyl methacrylate
BzMA: benzyl methacrylate
CHMA: cyclohexyl methacrylate
LAMA: lauryl methacrylate
EHMA: 2-ethylhexyl methacrylate
EHA: 2-ethylhexyl acrylate
CHA: cyclohexyl acrylate
A: triethylene glycol dimethacrylate (a = 3)
B: tripropylene glycol dimethacrylate (b = 3)
C: polyethylene glycol dimethacrylate (a = 9)
D: polypropylene glycol diacrylate (c = 9)
E: polyethylene glycol dimethacrylate (a = 14)
F: ethylene glycol dimethacrylate
G: allyl methacrylate
H: vinyl methacrylate
MAA: methacrylic acid
AA: acrylic acid
IA: itaconic acid
(Note)
*[1]Water content (wt %) = $\dfrac{W_1 - W_2}{W_1} \times 100$ wherein $W_1$ is the hydrated lens weight, and $W_2$ is the dehydrated lens weight.
*[2]Measurement of oxygen permeability coefficient (PO$_2$) was conducted at 30° C. with a film oxygen permeameter (product of Rika Seiki Kogyo K.K.). The unit for oxygen permeability coefficient is $10^{-11}$ ml · cm/cm$^2$ · sec · mmHg.
*[3]The tensile strength of each sample was determined by measuring the breaking strength in a physiological saline solution (20° C.) at a constant loading speed of 60 g/min. The unit for tensile strength is g/mm$^2$.
*[4]The elongation of each sample was determined by measuring the breaking elongation in a physiological saline solution (20° C.).

Elongation (%) = $\dfrac{L_1 - L_2}{L_1} \times 100$ wherein $L_1$ is the initial strength of a test piece; and $L_2$ is the length of the test piece immediately before breaking.

The samples prepared in Examples 2 to 11 were colorless and transparent and exhibited higher degrees of oxygen permeability than the comparative samples. In addition, the tensile strength and breaking elongation of sample Nos. 2 to 11 far exceeded the values attained by the conventional high-hydration contact lenses.

Such superior mechanical properties are only manifested by using N,N-dimethyl acrylamide in combination with a specified hydrophobic monomer containing the benzene ring, cyclohexyl ring or long-chained alkyl group, and with a specified long-chained crosslinking agent. The high water content of the lens is attained by combining N,N-dimethyl acrylamide with an unsaturated carboxylic acid having one ethylenically unsaturated bond.

While the invention has been described in detail and with reference to specific embodiments thereof, it will be apparent to one skilled in the art that various changes and modifications can be made therein without departing from the spirit and scope thereof.

What is claimed is:

1. A high-hydration contact lens with a water content of 60% or more which is made of a copolymer composed of (i) 40 to 90 wt% of N,N-dimethyl acrylamide, (ii) 5 to 50 wt% of a hydrophobic monomer, (iii) 0.1 to 10 wt% of an unsaturated carboxylic acid having one ethylenically unsaturated bond, and (iv) 0.01 to 5.0 wt% of a crosslinking agent, wherein the hydrophobic monomer is selected from the group consisting of phenyl acrylates, benzyl acrylates, phenyl methacrylates, benzyl methacrylates, alkyl acrylates, alkyl methacrylates, cyclohexyl acrylates and cyclohexyl methacrylates, and the crosslinking agent is selected from those represented by formula (I), (II), or (III)

$$CH_2=\overset{X}{C}-COO(CH_2CH_2O)_a OC-\overset{X}{C}=CH_2 \quad (I)$$

$$CH_2=\overset{X}{C}-COO(CH_2CH_2CH_2O)_b OC-\overset{X}{C}=CH_2 \quad (II)$$

$$CH_2=\overset{X}{C}-COO(CH_2\overset{CH_3}{C}HO)_c OC-\overset{X}{C}=CH_2 \quad (III)$$

wherein X represents a hydrogen atom or a methyl group, a is an integer of 2 to 23, and b and c each is an integer of 2 to 14.

2. A high-hydration contact lens as in claim 1, wherein the alkyl moiety in the alkyl acrylate and the alkyl methacrylates has 4 to 30 carbon atoms.

3. A high-hydration contact lens as in claim 1, wherein the hydrophobic monomer (ii) is selected from cyclohexyl methacrylates.

4. A high-hydration contact lens as in claim 1, wherein the unsaturated carboxylic acid (iii) is selected from acrylic acid, methacrylic acid, itaconic acid, crotonic acid, pyruvic acid, fumaric acid, and maleic acid.

5. A high-hydration contact lens as in claim 1, wherein the crosslinking agent (iv) is selected from those represented by formula (I), (II), or (III) wherein a, b and c each is an integer of 3 to 9.

* * * * *